United States Patent [19]

Roeck et al.

[11] Patent Number: 5,045,576

[45] Date of Patent: Sep. 3, 1991

[54] LATEX CONVERSION TO CATIONIC FORM USE, FOR EXAMPLE, IN CATIONIC ASPHALT EMULSION

[75] Inventors: Jesse S. Roeck; James G. Galloway; Ronald E. Snyder, all of Midland, Mich.

[73] Assignee: The Dow Chemical Company, Midland, Mich.

[21] Appl. No.: 228,100

[22] Filed: Aug. 4, 1988

[51] Int. Cl.$^5$ .............................................. C08K 95/00
[52] U.S. Cl. ...................................... 524/60; 524/61; 524/250; 524/251; 252/311.5
[58] Field of Search ................. 524/250, 251, 249, 60, 524/61; 252/311.5

[56] References Cited

U.S. PATENT DOCUMENTS

| | | | |
|---|---|---|---|
| 3,867,162 | 2/1975 | Elste, Jr. .......................... | 252/311.5 |
| 3,933,710 | 1/1976 | Fukushi et al. ........................ | 524/60 |
| 3,979,916 | 9/1976 | Califano et al. ........................ | 524/60 |
| 4,791,161 | 12/1988 | Leising ................................ | 524/458 |

FOREIGN PATENT DOCUMENTS 0246063 12/1987

Primary Examiner—Joseph L. Schofer
Assistant Examiner—Mark Sweet

[57] ABSTRACT

The present invention provides for a method of converting an anionic latex to a cationic latex by the addition of a steric stabilizer and a cationic surfactant. The invention also provides for a method of using the cationic latex prepared by the conversion, in an asphalt emulsion. The converted latex provides improved torsional recovery properties to the cured asphalt emulsion.

4 Claims, No Drawings

LATEX CONVERSION TO CATIONIC FORM USE, FOR EXAMPLE, IN CATIONIC ASPHALT EMULSION

BACKGROUND OF THE INVENTION

This invention relates to a process for preparing latexes for use in cationic asphalt emulsion or in other formulations such as composites or coatings, where a cationic latex could be used. Typically, latexes are prepared as anionic in character and their aqueous applications are therefore limited to uses in compatible systems i.e., anionic systems, unless the latex can be converted to, or prepared as, a cationic latex.

Preparing a cationic latex from a conventional emulsion polymerization process without requiring modification of present equipment would be ideal. If the latex is prepared as cationic during the polymerization of the monomers to polymer, modification of the present anionic systems would be required to accommodate the cationic polymerization system. However, if adding stabilizing agents will convert the polymer latex from the anionic form to the cationic form, such modification of polymerization systems would not be necessary.

One use for the cationic latex is in cationic asphalt emulsions. The asphalt emulsion containing latex is used in the construction and repair of roads, pavements, soil stabilization and the like. Typically, cationic asphalt emulsions are prepared from the combination of asphalt and an emulsifier solution of soap, latex, and acid. The asphalt emulsion, containing latex, is cured to an asphalt residuum and the residuum exhibits improvement in properties such as elasticity and ductility over residuum that does not contain latex.

One of the first known methods of incorporating latex polymers into asphalt residuum consisted of mixing the latexes with an emulsified asphalt. If the asphalt emulsion is anionic, the anionic latex will be compatible with the asphalt emulsion because the emulsion polymerization of butadiene and styrene to form synthetic rubber is most commonly carried out in an anionic system. Blending a latex elastomer with an anionic asphalt emulsion to impart improvement in properties such as elasticity and ductility of the asphalt residuum after the asphalt emulsion has cured, is practiced in the art. However, if the asphalt emulsion is cationic, the conventional anionic latex will not be compatible with the asphalt emulsion.

Cationic asphalt emulsifiers are more versatile compared to anionic emulsifiers because cationic emulsifiers result in an asphalt emulsion that can be worked satisfactorily with a broad range of aggregate, especially those aggregates that contain varying amounts of silica. The probable reason for the cationic asphalt emulsion superiority is that silica containing aggregates carry a negative charge and cationic emulsions, which are positively charged, are readily attracted thereto and readily become bound to these aggregate surfaces. The opposite charges facilitate a high demulsifying velocity which advantageously permits rapid reopening of the paved area to traffic.

Various techniques have been used to compatibilize an anionic latex with a cationic asphalt emulsion. A latex which contains nonionic emulsifiers can be combined with a cationic asphalt emulsion. However, the surfactant used to stabilize the latex remains in the asphalt after demulsification and can act as a diluent to the elastomeric properties of the modified asphalt residuum.

One such elastomeric property is measured by Percent Torsional Recovery, which is defined by the California Department of Transportation in Torsional Recovery Test Procedure CT332. If a good percent torsional recovery is desired in the asphalt residuum, the surfactant may interfere with such desirable properties.

One method to compensate for the interference of surfactant in the asphalt residuum, is by emulsion polymerizing latex monomers in the presence of nonionic emulsifiers and/or amphoteric additives. Nonionic emulsifiers have a latex stabilizing effect and prevent the latex from precipitating or coagulating as it passes through the isoelectric point from anionic to cationic form. Amphoteric additives are also stable in anionic or cationic mediums depending upon their charge, however such additives are inherently unstable at the isoelectric point.

Not all asphalt specifications require the use of latex in the asphalt emulsion. In the typical process of preparing an asphalt emulsion, two individual tanks, one containing asphalt and one containing a mixture of soap and an acid, are combined in a colloid mill to produce the asphalt emulsion. For asphalt emulsions requiring elastomer modification, typically a nonionic latex, polychloroprene, is added to the aqueous solution of soap and acid. The soap and the acid in the aqueous tank will alter the nonionic latex to cationic character thereby preserving the stability of the latex in the emulsifier solution. The latex is added to the aqueous tank and the aqueous tank contents are then combined with the asphalt. However, it would be advantageous to be able to add the latex to the asphalt emulsion directly, that is, after the asphalt is combined with the aqueous solution of soap and acid to form the asphalt emulsion. If the latex could be post-added, the asphalt emulsion could be prepared without the latex and when asphalt specifications require the use of latex in the asphalt emulsion, the latex could be subsequently added without having to prepare a separate latex asphalt emulsion.

A need therefore exists for an economic cationic latex asphalt that will overcome the disadvantages of the prior art and will combine the advantages of a cationic asphalt emulsion and a latex.

Accordingly, the present invention provides a method of converting an anionic latex to cationic form without altering the polymerization system. The invention also provides for a system of preparing asphalt emulsion whereby the latex is stable in the asphalt emulsion and the latex may be added to the asphalt either with the aqueous solution of soap and acid, or the latex may be directly added to the asphalt emulsion.

Increasing the performance of the asphalt emulsion would also be desirable. As discussed above, the percent torsional recovery of a latex in an asphalt emulsion can be undesirably reduced by the modifications of the anionic latex to the cationic form. It would also be desirable, therefore, to prepare a latex which when added as a component of the asphalt emulsion yields a greater percent torsional recovery in the asphalt residuum of the asphalt emulsion. A greater percent torsional recovery is thought to be indicative of greater wear, longevity and chip retention in the repaired pavement.

SUMMARY OF THE INVENTION

The present invention is a process for converting an anionic latex to a cationic latex which comprises emulsion polymerizing monomers to produce a latex having anionic character and adding to the anionic latex an effective amount of a cationic steric stabilizer and an effective amount of a cationic surfactant.

The present invention also provides for a process for preparing an asphalt emulsion which comprises:
(a) converting an emulsion polymerized anionic latex to a cationic latex by adding an effective amount of a steric stabilizer and an effective amount of a cationic surfactant to the anionic latex,
(b) adding the cationic latex solution to an asphalt emulsion.

The present invention also provides for a process for preparing an asphalt emulsion which comprises:
(a) converting an emulsion polymerized anionic latex to a cationic latex by adding an effective amount of a steric stabilizer and an effective amount of cationic surfactant,
(b) adding the cationic latex to an emulsifier solution, the emulsifier solution comprising, water, cationic surfactant and acid,
(c) adding the mixture to asphalt to form an asphalt emulsion.

DETAILED DESCRIPTION OF THE INVENTION

ASPHALT

The term "asphalt" as used herein, includes conventional asphalt known in the art which predominantly consists of bitumens and is prepared as residua of petroleum refining.

POLYMER LATEXES

The latexes of the present invention can be conventional anionic homopolymer or copolymer latexes known in the art prepared by conventional emulsion polymerization.

MONOMERS OF THE LATEXES

Representative monomers employable to produce homopolymer or copolymer anionic latexes to be used in the conversion to cationic latexes of the present invention include monovinyl aromatic monomer, aliphatic conjugated diene monomer, acrylate monomer, a vinylidene halide or vinyl halide monomer, vinyl esters of carboxyl acids containing from 1 to 18 carbon atoms, such as vinyl acetate or vinyl stearate, methacrylonitrile and acrylonitrile. Optionally a monoethylenically unsaturated carboxylic acid monomer could be used. Various mixtures of these monomers are also employable. Cross-linking agents such as divinylbenzene or ethylene glycol dimethacrylate could also be used.

The term "monovinyl aromatic monomer", as used herein, is meant to include those monomers with a radical of the formula

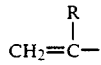

(wherein R is hydrogen or a lower alkyl such as an alkyl having from 1 to 4 carbon atoms) attached directly to an aromatic nucleus containing from 6 to 10 carbon atoms, including those wherein the aromatic nucleus is substituted with alkyl or halogen substituents. The preferred monomers are styrene and vinyltoluene.

The term "aliphatic conjugated diene", as used herein, is meant to include compounds such as 1,3-butadiene, 2-methyl-1,3-butadiene, piperylene (1,3-pentadiene), and other hydrocarbon analogs of 1,3-butadiene. Other monomers inclusive as aliphatic conjugated dienes are halogenated compounds such as 2-chloro 1,3 butadiene.

"Vinylidene halides" and "vinyl halides" suitable for this invention include vinylidene chloride and vinyl chloride, which are highly preferred. Vinylidene bromides and vinyl bromide can also be employed.

The term "acrylate", as used herein, is meant to include the acrylate or methacrylate monomers. Additionally, the acrylates can include acids, esters, amides, and substituted derivatives thereof. Generally, the preferred acrylates are $C_1$-$C_8$ alkyl acrylates or methacrylates. Examples of such acrylates include butyl acrylate, hexyl acrylate, tertbutyl acrylate, methylmethacrylate, butylmethacrylate, hexylmethacrylate, isobutylmethyacrylate, and isopropylmethacrylate. The preferred acrylates are ethyl acrylate, butyl acrylate and methylmethacrylate.

The term "monoethylenically unsaturated carboxylic acid monomer", as used herein, is meant to include those monocarboxylic monomers such as acrylic acid, and methacrylic acid: dicarboxylic monomers such as itaconic acid, fumaric acid, maleic acid, and their monoesters. Incorporating a monoethylenically unsaturated carboxylic acid monomer in the latex is thought to optimize the percent torsional recovery of the asphalt residuum which incorporates the carboxylated latex.

The chain transfer agent that could be employed to produce latexes suitable for conversion to the cationic form includes bromoform, carbon tetrachloride, alkyl mercaptans or other suitable known chain transfer agents could be used, depending upon a given monomer composition. Of these chain transfer agents, alkyl mercaptans are most preferred. Examples of some mercaptans are n-octyl, n-dodecyl, t-octyl, t-dodecyl mercaptan and so forth and mixtures thereof.

THE MODIFIERS

THE CATIONIC STERIC STABILIZER

The steric stabilizer is a post-additive to the copolymer latex or may be a comonomer of the latex copolymer. The steric stabilizing functionality of a comonomer or post-added steric stabilizer is defined herein as a component of the conversion process which will prevent the latex from coagulating or precipitating as it passes through the isoelectric point upon conversion from the anionic to the cationic form.

Typically, the steric stabilizer is a cationic steric stabilizer which can include polyoxyethylenated long-chain amines having the formula $[RNH[(CH_2CH_2O)_xH]_2]^+X^-$ at acidic pH or quaternized polyoxyethylenated long-chain amines having the formula $[RN(CH_3)[(C_2H_4O)_xH]_2]^+X^-$. Wherein R is H or a lower alkyl such as an alkyl having from 1 to 20 carbon atoms, X is a conventional salt anion such as $Cl^-$, $Br^-$, or $NO_3^-$ and x is from about 2 to about 50. Preferably, the cationic steric stabilizer will have a formula of the following:

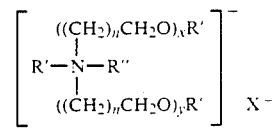

wherein:
X is a conventional salt anion such as Cl⁻ Br³¹ or NO₃⁻:
n equals about 3 or less:
x+y is equal to or greater than 15:
R' is a hydrogen or methyl and
R" is an alkyl having about 12 or more carbon atoms.

Representative cationic steric stabilizers within the above description include alkyl bis(2-hydroxyethyl) methyl quaternary ammonium chlorides such as the compositions found in Ethoquad ® 18/25, Ethoquad ® c/25 and Ethoquad ® 0/25 available from, and the trademark belonging to Akzo Chemie America.

Typically, an effective amount of cationic steric stabilizer will be that amount necessary to prevent the latex from coagulating or precipitating as it passes through the isoelectric point upon conversion from the anionic to the cationic form. A concentration which is not high enough to be effective will result in filtrate residue formation or a destabilization of the latex upon the addition of the cationic surfactant. A concentration which is higher than the effective amount will result in diminished end use performance (ductility, percent torsional recovery etc.) of the latex in the asphalt residuum of the asphalt emulsion. Preferably the effective amount will be from about 2 to about 10 weight percent active based on solids of latex. More preferably the effective amount will be from about 3 to about 4 weight percent active surfactant based on solids of latex.

THE CATIONIC SURFACTANT

The cationic constituent is defined herein as a component of the conversion process which will convert the anionic latex to a cationic form. The cationic constituent may be either a post-added cationic surfactant or a cationic comonomer incorporated in the latex copolymer.

The cationic surfactant is typically defined by the following formula:

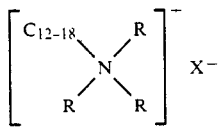

wherein X is a conventional salt anion such as Cl⁻, Br⁻, or NO₃⁻, and wherein one R can be a $C_{12-18}$ group and the remaining R groups can be methyl groups or each R group can be a methyl group.

Representative cationic surfactants within the above description include: quaternary ammonium salts such as those of the compositions:

Armak ® E-64R
Redicote ® I-90,
Redicote ® I-12HF,
Redicote ® I-78,
Arquad ® 12/33: RN(CH₃)₃Cl (R=C₁₂H₂₅) N,N,N-trimethyl-1-dodecylammonium chloride:
Arquad ® 18/50: RN(CH₃)₃Cl (R=C₁₈H₃₇) N,N,N-trimethyl-1-octadecylammonium chloride:
Arquad ® C-33: RN(CH₃)₃Cl (R=Coco Alkyls) coco alkyltrimethyl quanternary ammonium chloride;
Arquad ® S-50: RN(CH₃)₃Cl (R=Soya Alkyls) trimethylsoya alkyl quanternary ammonium chloride:
Arquad ® 16-29: C₁₆H₃₃N(CH₃)₃Cl N,N,N-trimethyl-1-hexadecylammonium chloride:
Duoquad ® T-50: N,N,N',N',N'-pentamethyl-N-tallow 1,3 propanediammonium chloride:
(all are available from and registered trademarks of Akzo Chemie America).

Typically an effective amount of cationic surfactant will be that amount necessary to convert the latex to a cationic form. Preferably the effective amount will be from about 1 to about 10 weight percent active based on latex solids. Most preferably the effective amount will be from about 3 to about 4 weight percent active based on latex solids.

PREPARATION OF THE CATIONIC LATEX

The cationic latex of the present invention is prepared by initially adding an effective amount of the cationic steric stabilizer and then an effective amount of the cationic surfactant to an anionic latex. The latex temperature should be sufficiently cool to allow the solubility of the nonionic substituent on the cationic steric stabilizer. If the temperature is high enough such that the nonionic substituent on the cationic steric stabilizer is insoluble, the latex is thought to agglomerate upon the addition of the cationic surfactant or leave an undesirable residue in a 150 micron diameter pore size filter.

DETERMINATION OF LATEX STABILITY AFTER CONVERSION

The stability of the latex is determined by passing the latex emulsion through a 100 mesh filter screen (150 micron diameter pore size) and gravimetrically determining the residue formation on the screen. Anything left in the screen is considered residue. The detection limit is 0.1 percent. If the latex coagulates due to latex instability during the conversion from anionic to cationic form, most of the solids will not pass through the screen.

DETERMINATION OF LATEX CHARGE AFTER CONVERSION

The latex is observed as positively charged if the particle migrates toward a negatively charged electrode of an electrophoresis cell.

PREPARATION OF THE ASPHALT EMULSION

The asphalt emulsions employed can be prepared by any method known to those skilled in the art, for example, by preparing a soap solution comprising water and a cationic surfactant. The soap solution or emulsifier solution, is then mixed in a colloid mill, or the like, with the asphalt phase, the latter being preferably heated to reduce the viscosity. Usually, the emulsifiers and any modifiers or promoters are dispersed in the water to form a soap solution which is then warmed to a temperature of 90° F. to 200° F. The asphalt can be heated to a temperature in the range of 150° F. to 350° F. The warm soap solution and hot asphalt are then proportioned to a colloid mill to emulsify the mixture, during which milling the temperature of the mixture can be in the range of 100° F. to 210° F. The completed emulsion is then transferred to storage. The method of preparing an asphalt emulsion will have some effect on the physical properties of the asphalt emulsion and the intended application or utility of the emulsion will dictate which particular method one should use to get the desired properties.

In addition, an acid such as hydrochloric acid, sulfuric acid, sulfamic acid or acetic acid can be incorporated into the asphalt emulsion to enhance the surface active properties of the cationic surfactant and impart an acid pH below 7 to the emulsion. Generally, emulsions having a pH in the range of 1 to about 6, preferably 2 to 5, are suitable for these acidic emulsions. The amount of the acid will generally be 0.1 to 1, preferably 0.2 to 1 weight percent of the emulsion, but can be considered and calculated as part of the cationic emulsifying agent. Sulfamic acid is especially useful where the asphalt used is of an aromatic nature and has an oil fraction which has an A.P.I. gravity not exceeding 15.5, and preferably not exceeding 15. The preferred acid is 1 Normal hydrochloric acid.

Typically the asphalt emulsion is specifically prepared in the following way:

PREPARATION OF THE EMULSIFIER SOLUTION

A 5 liter quantity of emulsifier solution is prepared by combining 4800 grams of water with 143 grams of 1N hydrochloric acid. 57 Grams of cationic surfactant, Armak® E-64R (trademark of Akzo Chemie America) is added and the mixture is stirred. The pH is then adjusted to 2 by using 1N hydrochloric acid.

PREPARATION OF THE ASPHALT EMULSION

The emulsion grade asphalt is heated in a metal container to about 140° C. The asphalt is poured into a heated feed pot and is kept at 140° C. in preparation for pumping. The emulsifier solution is placed in a feed pot and heated to about 50° C. The asphalt and emulsifier solution are then fed to the operating colloid mill by speed controlled gear pumps at an asphalt/emulsifier ratio of 65/35. The latex of the present invention could typically be added to the emulsifier solution or directly to the asphalt emulsion.

METHOD FOR DETERMINING RESIDUE BY EVAPORATION OF LATEX MODIFIED ASPHALT EMULSION

California Test 331, November 1984 available through the Department of Transportation, Division of Engineering Services in Sacramento California, describes the test method for determining the residue of Latex Modified Asphalt Emulsion. The residue remaining after the completion of the procedure is then tested for percent torsional recovery.

PERCENT TORSIONAL RECOVERY DETERMINATIONS

The percent torsional recovery test is performed on asphalt residue that is obtained from a latex modified asphalt emulsion by using the above described method for determining residue recovery procedure by evaporation. The percent torsional recovery yields data that is helpful in determining the degree of elasticity that results from the latex elastomer addition to the asphalt emulsion.

The percent torsional recovery test is described by California Test 332, November, 1984 available through the Department of Transportation, Division of Engineering Services in Sacramento California. The measurement is of the percent recovery after deformation of the residue. The greater the recovery, the more elasticity the latex imparts to the asphalt. The California specifications call for 18 percent recovery.

The following examples are not meant to limit the scope of the present invention but rather to more fully illustrate specific embodiments of the invention.

EXAMPLES

EXAMPLE 1

CONVERSION OF ANIONIC LATEX TO CATIONIC LATEX

PREPARING AN ANIONIC LATEX

An initial reactor mix comprising 63 parts water, 0.01 parts chelant, and a sufficient amount of seed latex to achieve a final particle size of about 1300 Å is combined in a reactor. The reactor is purged with nitrogen, agitated and heated. The monomer mix containing 22 parts styrene, 75 parts butadiene, 3.0 parts acrylic acid and 1.25 parts of a chain transfer agent is added to the reactor.

The aqueous mix containing 25 parts water, 0.7 parts of a free radical initiator, 0.5 parts of a sulfonated anionic surfactant, and 0.14 parts sodium hydroxide is added to the reactor. Following the additions of all charges, the mixture is continued to be agitated and heated under nitrogen for 1 hour. The latex is then steam distilled to remove unreacted monomers.

PREPARING THE CATIONIC LATEX

The latex is cooled to about room temperature and a 25 weight percent active solution in water of the cationic steric stabilizer at 4 weight percent active based on monomer, (Ethoquad® 18/25, a stearyl bis(2-hydroxyethyl) methyl quaternary ammonium ethoxylated chloride available from Akzo Chemie America) is added to the latex. The solution is sufficiently agitated at 15 to 20 rpm. The cationic surfactant is then added at a concentration of 3 weight percent active based on solids The stability of the latex is determined by measuring the amount of latex solids which pass through a 150 micron diameter screen. Less than 0.1 percent detection of residue on the screen indicates stability of the latex.

Electrophoresis is then used to determine whether the latex is converted to cationic character. The particular instrument used is a Rank Brothers Mark II Particle Micro-Electrophoresis Apparatus. The procedure is as follows: The latex is diluted to 0.1 weight percent solids with deionized water and placed in the Electrophoresis cell. Platinum electrodes are placed on opposite ends of the cell and a 20 to 100 volt potential is applied to the electrodes. The cell is illuminated with a quartz-iodine lamp and the cell is observed through a 30 power microscope. The latex particle charge is observed as positive by the immediate migration of the positively charged particle toward the negatively charged electrode.

EXAMPLE 2

PERCENT TORSIONAL RECOVERY OF ASPHALT RESIDUUM FROM LATEX MODIFIED ASPHALT EMULSION

PREPARATION OF THE ASPHALT EMULSION

The emulsifier solution is prepared by combining 926.5 grams of water and 11.5 grams of a cationic surfactant such as Redicote® E-64 R available from and the Trademark belonging to Akzo Chemie America. The solution is adjusted to a pH of 2 with a 1N solution of hydrochloric acid. If the latex is added to the emulsifier solution, 62 g of 48 weight percent solids of the latex is added prior to adjusting the pH of the solution.

1857 Grams of the asphalt, grade AC-5 is heated to 285° F.

The asphalt and emulsifier solution are then fed at a rate ratio of 65 to 35. A stator/rotor type colloid mill, operating at 3500 rpm is used for the emulsification Gear pumps feed the asphalt and emulsifier solution at a 65 to 35 rate ratio to the colloid mill. The resulting asphalt emulsion is 65 percent asphalt to 35 percent emulsifier solution.

If the latex is post-added to the asphalt emulsion, the latex is added to the asphalt emulsion by mixing about 3 percent by weight latex with about 97 percent by weight of the pre-prepared asphalt emulsion. The percent torsional recovery of the residuum is similar for both methods of latex addition.

Anionic latexes are prepared and converted as described in Example 1 and are added to the asphalt emulsions as in Example 2. The asphalt residuum is tested for percent torsional recovery as described above. The results are produced Table I. The latex compositions are included in Table I.

The data in Table II illustrate the value of the addition of both the cationic surfactant and steric stabilizer in converting the latex to cationic character. The ionic character of the latex is indicated in the Table by the electrophoresis charge of the treated latex. Examples 1 and Comparative Example 1B, which is not an example of the invention, are prepared with 4 weight percent steric stabilizer but Example 1 is additionally treated with 3 weight percent cationic surfactant. When the latexes are added to the asphalt emulsion, Example 1 having a positive character after conversion is stable in the asphalt emulsion for greater than 2 weeks. The Comparative Example 1B however having a negative character, is only stable in the asphalt emulsion for 1 day.

Comparative Example 1A, which is not an example of the invention, and Example 1, are each prepared with 3 weight percent cationic surfactant. However, Example 1 is additionally prepared with 4 weight percent steric stabilizer. Example 1A coagulated, rendering the latex useless.

TABLE II

| Latex Example | Percent Steric Stabilizer (Ethoquad ® 18/25) | Percent Cationic Surfactant (Redicote ® I-12 HF) | Electro-phoresis Charge | Torsional Recovery (percent) | Comments |
|---|---|---|---|---|---|
| Example 1 styrene/butadiene/acrylic acid: 22/75/3 | 4 | 3 | (+) | 27 | Stable greater than 2 weeks in asphalt emulsion |
| Comparative Example 1A styrene/butadiene/acrylic acid: 22/75/3 | — | 3 | Not Measurable | — | Not a stable latex |
| Comparative Example 1B styrene/butadiene/acrylic acid: 22/75/3 | 4 | — | (−) | 24 | Not stable in asphalt emulsion greater than 1 day |

An anionic 25/75 non-carboxylated styrene/butadiene latex, is also added, converted to cationic form, added to an asphalt emulsion, cured to a residuum and tested for percent torsional recovery. The results are reported in the table below. The data in Table I illustrate the greater percent torsional recovery produced by a carboxylated latex as compared to a non-carboxylated latex.

Table III indicates that the chloroprene/methacrylic latex, Example 2, which is Neoprene ® 115 available from DuPont, adequately performed in asphalt emulsion prepared by a post-add method as described in Example 2, only when treated with both the steric stabilizer and the cationic surfactant of the present invention.

TABLE III

| Latex | Percent Steric Stabilizer (Ethoquad ® 18/25) | Percent Cationic Surfactant (Redicote ® I-12 HF) | Electro-phoresis Charge | Torsional Recovery (percent) | Comments |
|---|---|---|---|---|---|
| Example 2 Chloroprene/Methacrylic Acid (Neoprene ® 115 available from Du Pont) | 4 | 3 | (+) | 28 | Stable greater than 2 weeks in asphalt emulsion |
| Comparative Example 2 Chloroprene/Methacrylic Acid (Neoprene ® 115 available from Du Pont) | — | 4 | Not Measurable | — | Not a stable latex coagulated |

TABLE I

| Sample 3 percent latex in asphalt | Percent Torsional Recovery |
|---|---|
| 22/75/3-styrene/butadiene/acrylic acid | 29.30 |
| 22/75/3-styrene/butadiene/acrylic acid | 19.30 |
| 22/75/3-styrene/butadiene/acrylic acid | 20.10 |
| 19/78/3-styrene/butadiene/acrylic acid | 31.40 |
| 25/72/3-styrene/butadiene/acrylic acid | 30.10 |
| 25/75-styrene/butadiene | 8.80 |

The data in Table IV illustrate the performance of a carboxylated latex in asphalt emulsion. Example 3 is not prepared with a carboxylated latex and even with the addition of the steric stabilizer and cationic surfactant, the torsional recovery is less than Example 2 of Table III. If percent torsional recovery properties are to be optimized, the latex should be carboxylated.

TABLE IV

| Latex | Percent Steric Stabilizer (Ethoquad ® 18/25) | Percent Cationic Surfactant (Redicote ® I-12 HF) | Electro-phoresis Charge | Torsional Recovery (percent) |
|---|---|---|---|---|
| Example 3 Styrene/Butadiene 25/75 Polysar ® PL 420 available from Polysar Corp. | 4 | 3 | (+) | 12 |
| Comparative Example 3 Styrene/Butadiene 25/75 Polysar ® PL 298, a cationic latex available from Polysar Corp. | — | — | (+) | 13 |

Table V illustrates additional latexes which are converted by the conversion process of the present invention. Example 4 is an acrylate carboxylated latex and Example 5 is a styrene-acrylate carboxylated latex. Each is converted to cationic form from anionic form using the process of Example 1 and each is stable in the cationic asphalt emulsion prepared using the process of Example 2.

TABLE V

| Latex | Percent Steric Stabilizer (Ethoquad ® 18/25) | Percent Cationic Surfactant (Redicote ® I-12 HF) | Electro-phoresis Charge | Comments |
|---|---|---|---|---|
| Example 4 Methyl methacrylate/-n-Butyl Acrylate/Acrylic Acid 55/45/2 | 3 | 3 | (+) | stable in the cationic asphalt emulsion |
| Example 5 Styrene/n-Butyl Acrylate/Acrylic Acid 39/59/2 | 3 | 3 | (+) | stable in the cationic asphalt emulsion |

What is claimed is:
1. A process for preparing an asphalt emulsion which comprises:
   (a) emulsion polymerizing monomers to prepare an emulsion polymerized anionic latex wherein the anionic latex monomers are selected from the group consisting of,
      (i) at least one monovinyl aromatic monomer, at least one acrylic monomer and at least one monoethylenically unsaturated carboxylic acid monomer;
      (ii) at least one monovinyl aromatic monomer, at least one aliphatic conjugated diene monomer and at least one monoethylenically unsaturated carboxylic acid monomer; and
      (iii) at least one acrylic monomer and at least one monoethylenically unsaturated carboxylic acid monomer;
   (b) converting the emulsion polymerized anionic latex to a cationic latex by adding an effective amount of steric stabilizer and an effective amount of a cationic surfactant,
   (c) adding the cationic latex to an emulsifier solution which comprises water, cationic surfactant and acid to form a mixture,
   (d) adding the mixture to asphalt to form an asphalt emulsion.
2. A process for preparing an asphalt emulsion which comprises:
   (a) emulsion polymerizing monomers to prepare an emulsion polymerized anionic latex wherein the anionic latex monomers are selected from the group consisting of,
      (i) at least one monovinyl aromatic monomer, at least one acrylic monomer and at least one monoethylenically unsaturated carboxylic acid monomer;
      (ii) at least one monovinyl aromatic monomer, at least one aliphatic conjugated diene monomer and at least one monoethylenically unsaturated carboxylic acid monomer; and
      (iii) at least one acrylic monomer and at least one monoethylenically unsaturated carboxylic acid monomer;
   (b) converting the emulsion polymerized anionic latex to a cationic latex by adding an effective amount of steric stabilizer and an effective amount of a cationic surfactant,
   (c) adding the cationic latex solution to an asphalt emulsion.
3. A process for preparing an asphalt emulsion which comprises:
   (a) emulsion polymerizing monomers to prepare an emulsion polymerized anionic latex wherein the anionic latex monomers are selected from the group consisting of,
      (i) at least one monovinyl aromatic monomer, at least one acrylic monomer and at least one monoethylenically unsaturated carboxylic acid monomer;
      (ii) at least one monovinyl aromatic monomer, at least one aliphatic conjugated diene monomer and at least one monoethylenically unsaturated carboxylic acid monomer; and
      (iii) at least one acrylic monomer and at least one monoethylenically unsaturated carboxylic acid monomer;
   (b) converting the emulsion polymerized anionic latex to a cationic latex by

(i) adding a steric stabilizer to the anionic latex, the steric stabilizer being represented by the formula:

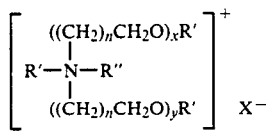

wherein:
S is a salt anion;
n equals about 3 or less;
x+y is equal to or greater than 15;
R' is a hydrogen or methyl; and
R'' is an alkyl having about 12 or more carbon atoms, and (iii) adding the latex and steric stabilizer solution to an emulsifier solution which comprises an effective amount of water and an effective amount of cationic surfactant represented by the formula:

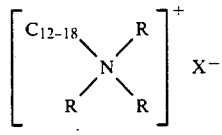

wherein X is a salt anion and wherein one R is a $C_{12-18}$ group and the remaining R groups are methyl groups or each R group is a methyl group, and (c) adding the mixture to asphalt to yield an asphalt emulsion, wherein curing the asphalt emulsion yields an asphalt residuum and wherein the asphalt residuum yeilds a percent torsional recovery of greater than about 18.

4. A process for preparing an asphalt emulsion which comprises:
(a) emulsion polymerizing monomers to prepare an emulsion polymerized anionic latex wherein the anionic latex monomers are selected from the group consisting of,
(i) at least one monovinyl aromatic monomer, at least one acrylic monomer and at least one monoethylenically unsaturated carboxylic acid monomer;
(ii) at least one monovinyl aromatic monomer, at least one aliphatic conjugated diene monomer and at least one monoethylenically unsaturated carboxylic acid monomer; and
(iii) at least one acrylic monomer and at least one monoethylenically unsaturated carboxylic acid monomer;

(b) converting the emulsion polymerized anionic latex to a cationic latex by
(i) adding a steric stabilizer to the anionic latex, the steric stabilizer being represented by the formula:

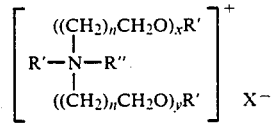

wherein:
X is a salt anion;
n equals about 3 or less;
x+y is equal to or greater than 15;
R' is a hydrogen or methyl; and
R'' is an alkyl having about 12 or more carbon atoms, and (iii) adding the cationic latex solution to an asphalt emulsion which comprises:

(c) an emulsifier solution comprising an effective amount of water and an effective amount of cationic surfactant represented by the formula:

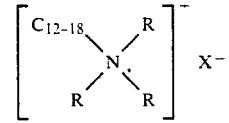

wherein X is a salt anion and wherein one R is a $C_{12-18}$ group and the remaining R groups are methyl groups or each R group is a methyl group, and (d) asphalt to yield an asphalt emulsion, wherein curing the asphalt emulsion yields an asphalt residuum and wherein the asphalt residuum yields a percent torsional recovery of greater than about 18.

* * * * *

UNITED STATES PATENT AND TRADEMARK OFFICE
CERTIFICATE OF CORRECTION

PATENT NO. : 5,045,576

DATED : September 3, 1991

INVENTOR(S) : Jesse S. Roeck, Ronald E. Snyder and James G. Galloway

It is certified that error appears in the above-identified patent and that said Letters Patent is hereby corrected as shown below:

On the title page, in item [75] Inventors: please change the inventors to read as follows:

--[75] Inventors: Jesse S. Roeck; Ronald E. Snyder; James G. Galloway--.

Col. 13, (claim 3) line 19, delete "(iii)" change to --(ii)--.

Col. 14, (claim 4) line 28, delete "(iii)" change to --(ii)--.

Signed and Sealed this

Second Day of March, 1993

Attest:

STEPHEN G. KUNIN

Attesting Officer

Acting Commissioner of Patents and Trademarks